United States Patent [19]

Kessels et al.

[11] Patent Number: 5,483,354
[45] Date of Patent: Jan. 9, 1996

[54] IMAGE FORMING METHOD AND RECORDING DEVICE

[75] Inventors: Gerardus G. J. C. Kessels; Eduardus J. W. Van Vliembergen, both of Venlo, Netherlands

[73] Assignee: OCE-Nederland, B.V., MA Venlo, Netherlands

[21] Appl. No.: 248,217

[22] Filed: May 24, 1994

[30] Foreign Application Priority Data

Jun. 8, 1993 [NL] Netherlands .............. 9300981

[51] Int. Cl.⁶ ............... H04N 1/21; H04N 1/387; G06T 3/60; G06T 9/00
[52] U.S. Cl. ............. 358/444; 358/448; 358/300; 382/232; 382/297; 382/305
[58] Field of Search .................... 358/444, 404, 358/448, 401, 296, 300; 382/46, 297, 296, 305, 232; 355/319, 320, 23, 24

[56] References Cited

U.S. PATENT DOCUMENTS

| | | | |
|---|---|---|---|
| 4,453,841 | 6/1984 | Bobick et al. | |
| 4,658,430 | 4/1987 | Anderson et al. | 382/297 |
| 4,689,824 | 8/1987 | Mitchell et al. | 382/297 |
| 4,929,085 | 5/1990 | Kajihara | 382/297 |
| 5,034,733 | 7/1991 | Okazawa et al. | 382/297 |
| 5,347,596 | 9/1994 | Dominguez, Jr. et al. | 382/297 |

FOREIGN PATENT DOCUMENTS

| | | |
|---|---|---|
| 0147701 | 7/1985 | European Pat. Off. |
| 0188678 | 7/1986 | European Pat. Off. |
| 21469 | 1/1992 | Japan |

*Primary Examiner*—Scott A. Rogers
*Attorney, Agent, or Firm*—Birch, Stewart, Kolasch & Birch

[57] ABSTRACT

An image forming method and apparatus in which digital image data is stored in a memory and read out of the memory to form images on copy sheets in a first image orientation or in a second image orientation rotated through 180° with respect to the first image orientation, first image data relating to images to be formed in the first orientation being stored in the memory in ascending address sequence, starting from the first free memory address, and second image data relating to images to be formed in the second orientation being stored in the memory in descending address sequence, starting from the last free memory address, while reading out from the memory is effected in ascending address sequence for both the first and the second image data.

4 Claims, 2 Drawing Sheets

IMAGE FORMING METHOD AND RECORDING DEVICE

BACKGROUND OF THE INVENTION

1. Field of the Invention

The invention relates to an image-forming method and apparatus in which digital image data representing image information from one or more documents, is stored in a memory and read out of the memory to form images on copy sheets in a first image orientation or in a second image orientation rotated through 180° with respect to the first orientation.

2. Discussion of Related Art

A method is known from U.S. Pat. No. 4,453,841, in which copy sheets can be provided with an image on the front and back. In these conditions, when processing copy sheets so transported through the image forming device that the longest peripheral side extends in the direction of transport, it is necessary that the image data for the front or back should be rotated through 180° to ensure that the orientation of the image information is the same on the front and back of the sheet. This is effected by reading out of the memory in the reverse sequence the image data for that side of a copy sheet whose image data has to be rotated through 180° or storing the same in the memory already in the reverse sequence. The latter option is the most attractive because, in that way, reading out of the memory for image forming purposes can always take place in the same direction irrespective of the orientation. However, in storing image data which is to be stored in the memory in the reverse sequence there is the problem that it is not possible to efficiently use the available memory space.

Since it is impossible to know beforehand how much memory space such image data will occupy, certainly if the image data is to undergo compression, the option chosen is to reserve a predetermined memory space which is ample enough on the basis of the least favorable situation in respect of data compression.

SUMMARY OF THE INVENTION

Therefore, it is an object of the present invention to provide a digital image data system which will overcome the above-noted disadvantage.

It is a further object of the present invention to provide an improved image forming method and apparatus in which digital image data representing image information from one or more documents, is stored in a memory and read out of the memory to form images on copy sheets in a first image orientation or in a second image orientation rotated through 180° with respect to the first orientation.

A further object of the present invention is to provide an image forming method and apparatus in which digital image data representing image information from one or more documents is stored in a memory and read out of the memory to form images on copy sheets wherein effective use is made of the available memory space.

The foregoing object and others are accomplished in accordance with the present invention, generally speaking, by providing an information system in which digital image data representing image information from one or more documents is stored in a memory and read out of the memory to form images on copy sheets in a first image orientation or in a second image orientation rotated through 180° with respect to the first orientation, first image data which relates to images to be formed on copy sheets in the first image orientation being stored in the memory in ascending address sequence, the second image data which relates to images to be formed on copy sheets in the second image orientation being stored in the memory in descending address sequence, and reading out from the memory taking place in ascending address sequence for both the first and the second image data. The first image data is stored in the memory starting from the first free memory address and the second image data is stored in the memory starting from the last free memory address. As a result, there is no need to reserve any predetermined memory space for the image data required to be stored in reverse sequence in the memory. In this way, the available memory space is used without any capacity loss extremely effectively, because the image data which is not required to be rotated is stored in the memory from the first free memory address from front to back and the image data required to be rotated is stored in the memory from the last free memory address from back to front. The available memory space is thus used without any capacity loss and hence, extremely efficiently, because both the first and the second image data are stored in contiguous relationship and hence the memory space still available remains contiguous.

BRIEF DESCRIPTION OF THE DRAWINGS

The invention will be explained in detail with reference to the following description and accompanying drawings wherein.

DETAILED DISCUSSION OF THE INVENTION

Figure 1:
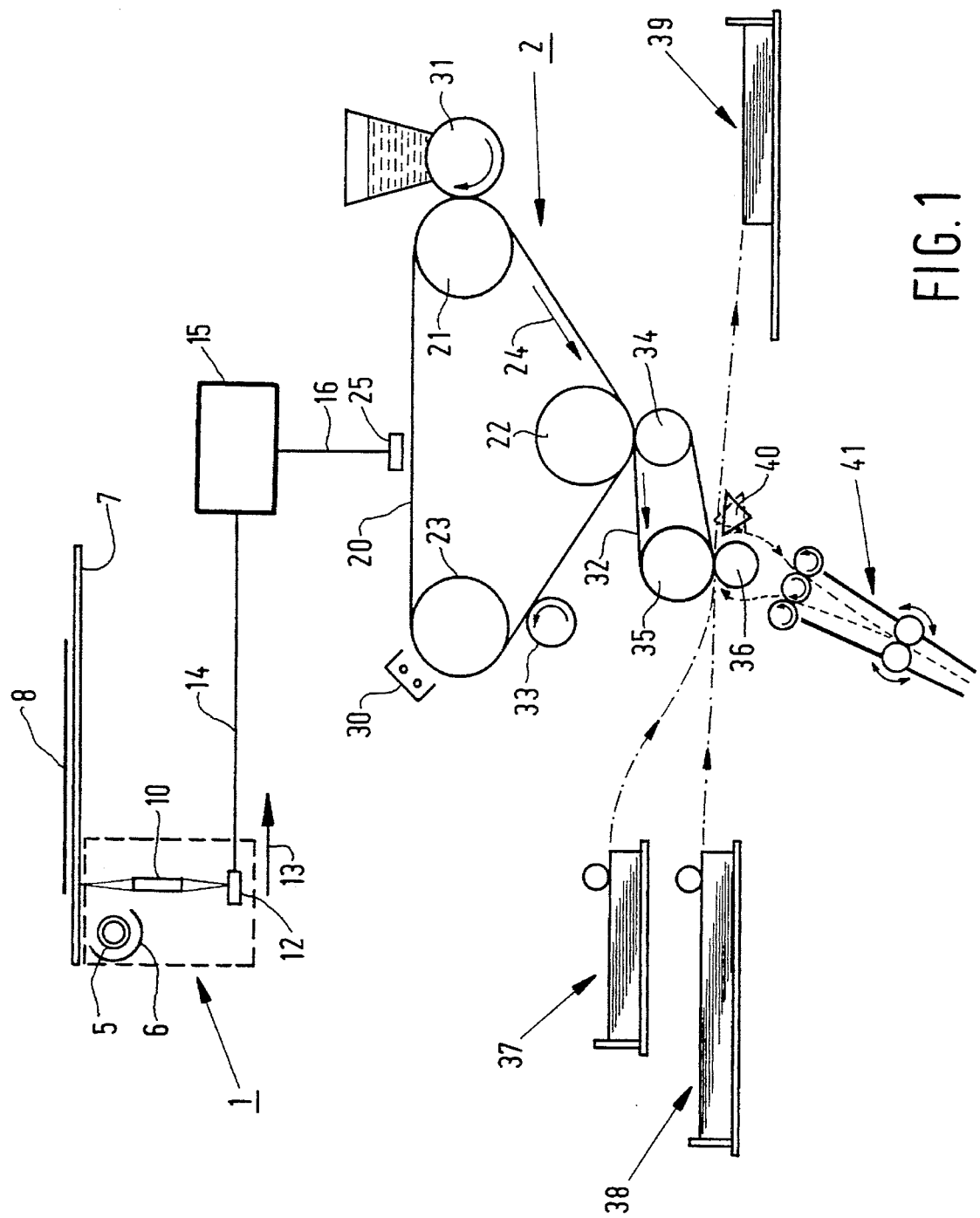
FIG. 1 is a diagram showing an image recording device using the method according to the invention, and FIG. 2 diagrammatically illustrates part of an image processing device for performing the method according to the invention.

The image recording device shown in FIG. 1 comprises a scanning device 1 and a printing device 2. The scanning device 1 is provided with a tubular lamp 5, a reflector 6 co-operating therewith, and by means of which a narrow strip of a document 8 on a platen 7 is exposed, and an array 10 of imaging glass fibers (a "Selfoc" lens array), by means of which the light reflected image-wise by the document is projected on to a sensor array, e.g. in the form of a CCD array 12.

The scanning device 1 is advanced by a known drive means in the direction of arrow 13 at uniform speed so that the document 8 is scanned line-wise by the CCD array 12. In this way, each image dot on the document is converted to an analog signal corresponding to the grey value of that image dot. The analog signal is then converted by an A/D converter to an 8-bit digital signal for each image dot, whereupon the digital signals (image data) are fed to an image processing device 15 via a number of parallel lines of a data bus 14. In the image processing device 15 the image data, often in compressed form, is stored in a memory and subjected to one or more known image processing operations (thresholding, dithering, histogramming, enlargement, reduction, rotations etc.) The image data processed in this way is then returned to the memory or placed in another memory and then, possibly after decompression, fed to the printing device 2 via a data bus 16. The printing device 2 is provided with an endless photoconductive belt 20 which is advanced at a uniform speed in the direction of arrow 24 by drive or guide rollers 21, 22 and 23 respectively. An LED array 25 is so controlled by means of the processed image data fed via data bus 16 that the photoconductive belt 20 after electrostatic charging via a corona device 30 is exposed imagewise line by line.

The latent image charge formed on the belt 20 as a result of the exposure is developed with toner powder by means of a magnetic brush device 31 to produce a toner image which in a first transfer zone is then brought into contact under pressure with an endless intermediate belt 32 made of or covered with a resilient and heat-resistant material, e.g. silicone rubber. In these conditions the toner image is transferred by adhesive forces from the belt 20 to the belt 32. After this image transfer, any toner powder residues remaining are removed from the photoconductive belt 20 by a cleaning device 33, so that the belt 20 is ready for re-use. The intermediate belt 32 is trained about drive and guide rollers 34, and 35, the intermediate belt 32 being heated to a temperature above the softening temperature of the toner powder, e.g. by an infrared radiator, disposed inside roller 35. While the belt 32 with the toner image thereon is being advanced, the toner image becomes tacky as a result of the heating.

In a second transfer zone between the belt 32 and a pressure roller 36, the tacky toner image is transferred under the influence of pressure onto and simultaneously fixed to a copy sheet fed from one of the reservoirs 37 or 38. The copy obtained in this way can finally be deposited in a receiving tray 39 or be fed by a deflector element 40 (disposed in the position indicated by broken lines), to a turn-over device 41. The copy sheet is turned over in device 41, and is then re-fed to the second transfer zone between the belt 32 and the pressure roller 36 in order to be printed with a powder image on the other side in the transfer zone and then deposited in the tray 39.

FIG. 1 shows only two copy sheet reservoirs 37 and 38, but of course the number of reservoirs can be extended to accommodate different sheet formats (e.g. A5, A4 and A3 and also other e.g. American formats). In addition, it is necessary to be able to feed the various copy sheet formats in different orientations, namely longitudinal feed (with the longest peripheral side in the direction of transport) or transverse feed (with the shortest peripheral side in the direction of transport), so that copies of one and the same copy sheet format can be produced with the orientation of the image information situated optionally in the direction of transport of the copy sheets through the image recording device or at right angles thereto. Although it is obvious to process copy sheets in the transverse feed orientation from the aspect of the production speed of the image recording device, and it is almost usual to provide the image information thereon in the same orientation, there are applications in which a different orientation of the copy sheets and/or the image information is selected. On the one hand, copy sheets whose longest peripheral side dimension is larger than the working width of the image recording device can be processed only in the longitudinal feed orientation, in which case the image orientation is usually also required in the direction of transit. On the other hand, orientation of the image information in the direction of copy sheet transit is required in the application in which two blocks of image information (two original pages) are to be imaged next to one another on a copy sheet in the transverse feed orientation (e.g. two A5 format images on an A4 copy sheet). A number of copies formed in this way is folded between the blocks of image information, for example, after being deposited, and may if required be stapled in order thus to form a booklet. In the processing of image information with an orientation in the direction of transit to form copies printed on both sides, however, there is the problem that the turning over of the sheet in the turn-over device 41 causes the image information on the back of the copies to be rotated through 180° with respect to the image information on the front, and of course this is unacceptable. One solution to this problem comprises feeding the image data from either the front or back of the document 8 rotated through 180° from the image processing device 15 to the printing device 25. For this purpose, 180° rotation of the image data is carried out in the image processing device 15 in a manner to be described hereinafter with reference to FIG. 2.

Figure 2:
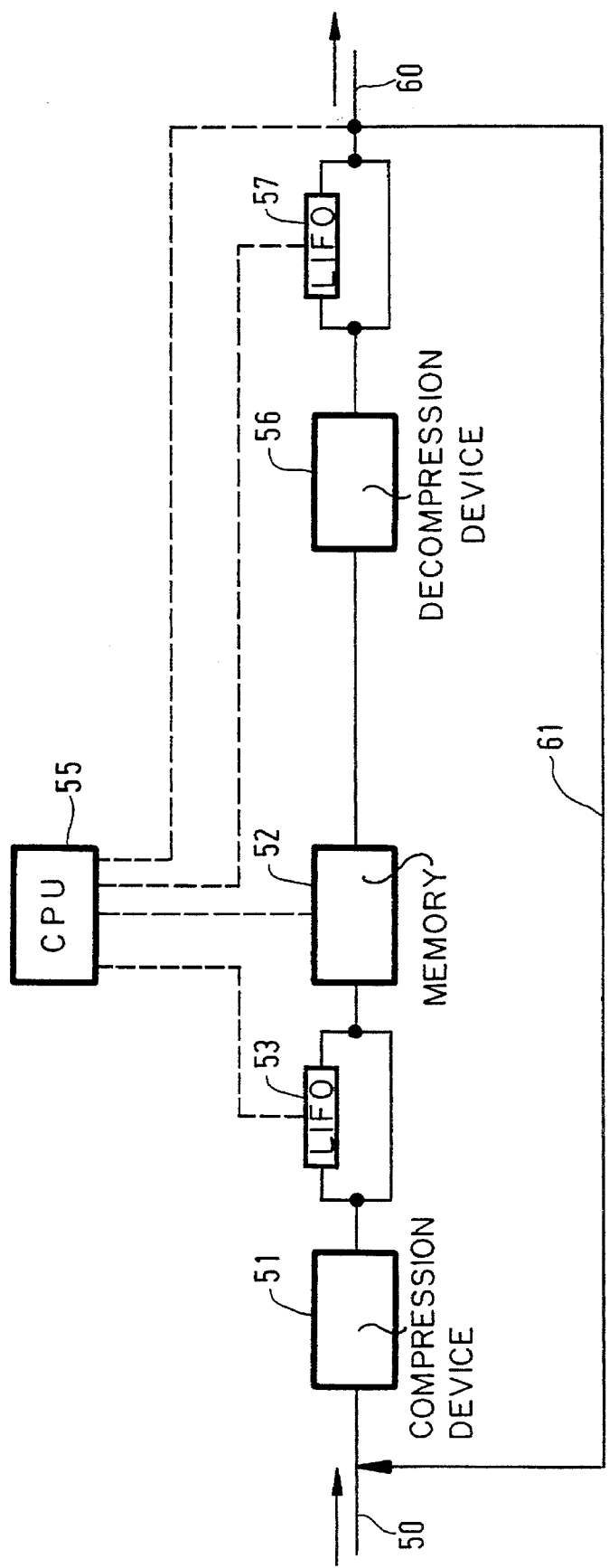

FIG. 2 shows that part of the image processing device 15 by means of which the 180° rotation of the image data can be effected by two consecutive mirrorings of the image data, such mirrorings being carried out with respect to axes at right angles to one another. The digital signals for each image dot are fed via a data line 50 to a compression device 51 in which the image data for each scanned line of the document 8 is compressed in a manner known in the art. The compressed data is then stored in the memory 52. The image data of all the documents required for a specific copy job are then stored line by line in said memory 52. In these conditions, the image data of those documents which do not need to be rotated are stored in the memory directly from the compression device 51, in ascending address sequence starting from the first memory address. The beginning and end addresses inter alia of each document are stored in the memory and the addresses of the freely available memory space are registered in the central control unit 55 of the image recording device shown diagrammatically in FIG. 2. The image data of those documents which are to be rotated through 180° is placed in the memory 52 in a different way in order that the first of the two mirrorings required can be carried out in this way in combination with reading out of the memory 52 in the correct sequence. The image data of these documents is fed to the memory 52 line by line from the compression device 51 and stored therein in descending address sequence starting from the last free memory address.

In order that the first mirroring of the image data can then be carried out during the reading out of the memory 52 in ascending address sequence, the compressed image data must be reversed, in respect of each scanned line of the document 8, in sequence within each line, before the data is stored in the memory 52. This reversion of the image data for each line is carried out in a LIFO line memory 53. The operation of the LIFO line memory (LIFO=Last-In-First-Out) is such that of the digital signals of one line fed serially to the line memory 53, the last signal fed to the memory 53 is the first to be outputted and vice versa.

The above-described method provides optimal use of the memory 52 because, on the one hand, that image data which does not have to be rotated is stored in the memory in contiguous relationship in ascending address sequence from the first free memory address while on the other hand the image data which is required to be rotated through 180° is stored in contiguous relationship in descending address sequence from the last free memory address. As a result, the memory space still available is also contiguous and hence available for optimal use. In this way it is possible also for all the image data stored in the memory to be read out therefrom in the same direction, i.e. in ascending address sequence. After a set of documents of a copying job or part of the set has been stored in the memory 52 in the manner described above, the various process functions of the printing device 2 can be controlled by the central control device 55. In these conditions the central control device 55 also controls the reading out of the image data from the memory 52 in the document sequence programmed for a specific copying job.

As already stated, the image data is read out of the memory 52 in ascending address sequence, the image data of one line being fed each time to a decompression device 56 to be decompressed therein in a manner known from the art. With regard to those documents whose image data must be rotated through 180°, this read-out method has the effect that the first mirroring (of image lines within the document) is carried out in this way. After the processing of the image data by the decompression device 56, the image data is subjected to other known image processing operations via a data bus 60 for each image line and finally fed to the LED array 25 of the printing device 2.

The second mirroring of the image data (image dots within each image line) by means of which the intended 180° rotation is completed, is effected by means of a LIFO line memory 57 which, in a similar manner to the above-described LIFO line memory 53, reverses the sequence of the image dots within a line. The data of those documents which do not undergo rotation is fed directly from the decompression device 56 to the data bus 60.

The above description assumes that it is already known which documents will require 180° rotation of the image data to effect the correct orientation of the image information when the copying job for the image-recording device is programmed. However, there may be cases in which, just after the set of documents has been scanned by the scanning device 1 and the image data has been stored in the memory 52, it is found that the image data has to be rotated through 180° in respect of one or more documents. In that case the associated image data is read out from the memory 52 and again fed to the image rotation operation via a data bus 61 (see FIG. 2). In these conditions, such data is placed in the memory 52 directly in descending address sequence via the decompression device 56 and the compression device 51 (and hence not via the LIFO line memory 53), whereby the first mirroring of the image lines within the document is effected because reading out from the memory 52 always takes place in ascending address sequence. The second mirroring of image dots within each image line is then carried out, while reading out the associated data, by reversing in sequence such data within an image line by means of a LIFO line memory 57 for each image line, and then feeding the data to the data bus 60.

In the above-mentioned situation in which rotation through 180° is required subsequently, it may occur that decompression and compression of the image data during the rotation process results in a different compression factor of a document. This may give rise to problems if the compression factor during this subsequent rotation is reduced and thus more memory space is required in the memory 52 than before the rotation process. To obviate such problems, in this situation the compression technique applied is adapted in manner known per se. In addition, it is attractive to sort the documents from the central control device 55 in a manner known from the art in respect of the quantity of image data (difference between beginning and end addresses of such image data) for each document and, during the subsequent rotation, start with the document having the largest quantity of image data and then reading the other documents successively out of the memory 52 in sequence of descending quantity of image data and again storing them in the memory 52. In this way image data can be prevented from being spread over a number of locations in the memory 52 during this rotation.

The control of the image processing components of FIG. 2 and hence the control of the data streams according to the invention, is effected in a manner known per se from the central control device 55 and is shown diagrammatically by broken lines in FIG. 2. Although 180° rotation of the image data is described above as a solution to problems which may occur in respect of image orientation in the direction of transit in combination with processing to copies printed on both sides, there are other applications in which use can be made of the possibilities offered by rotation, as shown in FIG. 2. One such application, for example, is making booklets by printing two blocks of image information next to one another on a copy sheet, such blocks being disposed at 180° rotation relatively to one another, and folding such a copy sheet between the two blocks of image information. In another application, the 180° rotation can be used to ensure, independently of the positioning of the document 8 on the platen 7 (top of the image on the document 8 at the front or rear of the image recording device) that the top of the image on the copy is always situated at the front or the rear of the image recording device in order to create a clear situation for the finishing, e.g. stapling, of the copies. In addition, there are specific applications possible for the rotation according to FIG. 2, in which it is not the complete 180° rotation which is applied, but only one of the two mirrorings of the image data making up the 180° rotation.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An image-forming method in which digital image data having the form of successive lines of raster data, representing image information from one or more documents is stored, in compressed form, in a memory and read out of that memory to form images on copy sheets in a first image orientation or in a second image orientation rotated through 180 degrees with respect to the first orientation, comprising (1) compressing and storing first image data which relates to images to be formed on copy sheets in said first image orientation in said memory in ascending address sequence starting from a first free memory address;

(2) compressing second image data, which relates to images to be formed on copy sheets in said second image orientation, into groups having a length of one image line;

(3) for each respective group reversing the order of said compressed image data corresponding to it, and storing said reversed compressed data in said memory in descending address sequence, starting from a last free memory address;

(4) reading out from said memory in ascending address sequence;

(5) decompressing said readout data, for both said first and said second image data; and (6) in the case of said second image data, reversing the order of each respective group of said decompressed image data.

2. An image recording device, comprising:

means for generating digital image data representing image information from one or more documents, a compression device for compressing said digital image data, a first means for selectively reversing the order of data in a first group of data, a memory for the storage of compressed image data, a decompression device for decompressing compressed image data, a second means for selectively reversing the order of data in a second group of data, an image forming device by which images are formed on copy sheets in a first image orientation or in a second image orientation rotated through 180 degrees with respect to said first orientation, and control means for controlling said compression device, said first reversing means, said memory, said decompression device and said second reversing means in such a way that (1) first image data from said data generating means, which relates to images to be formed on copy sheets in said first image orientation is compressed and stored in a memory in ascending address sequence starting from a first free memory address; and said stored data is read out from said memory in ascending address sequence, decompressed and delivered to said image forming device; and (2) second image data from said data generating means, which relates to images to be formed on copy sheets in said second image orientation, is compressed and then reversed in order in groups having the length of one image line, and stored in said memory in descending address sequence, starting from a last free memory address; and said stored data is read out from said memory in ascending address sequence, decompressed, reversed in order per group and delivered to said image forming device.

3. An image recording device according to claim 2, wherein said first reversing means is a LIFO line memory.

4. An image recording device according to claim 2, further including a connection between said second reversing means and said compression device, whereby said control means is adapted for controlling a process of converting and storing image data, stored in said memory and relating to images to be formed on copy sheets in one of said first or second image orientations, said image data relating to images to be formed on copy sheets in the other of said first or second image orientations, using said connection in said process, wherein said control means is provided with means for sorting said image data stored in said memory as to the length of each block of data, a block of data corresponding to one document page, and wherein said control means is also adapted to apply said conversion process to a longest block first and then to the remaining blocks in the order of descending block lengths.

* * * * *